Jan. 23, 1968     C. C. SCHMIDT     3,364,724
DRIVE EDGE BENDING TOOL
Filed March 2, 1965
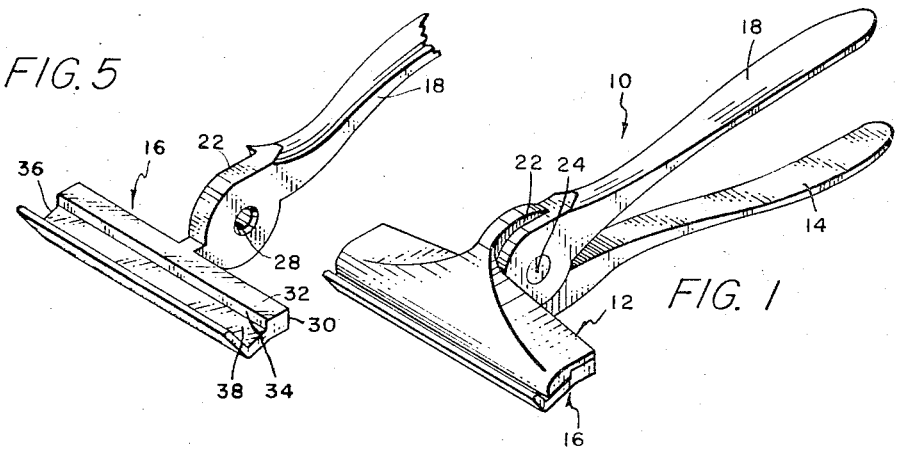
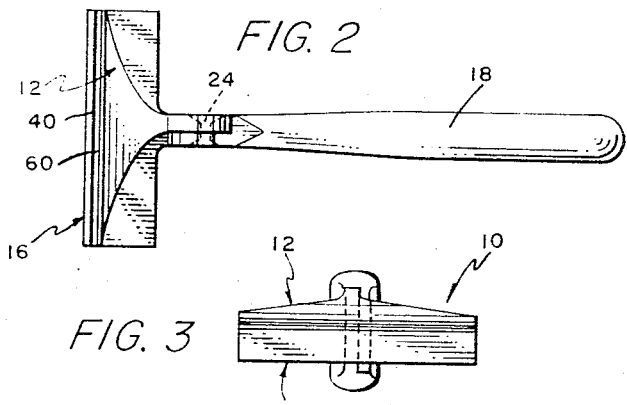
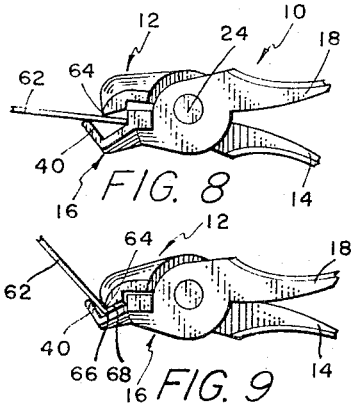
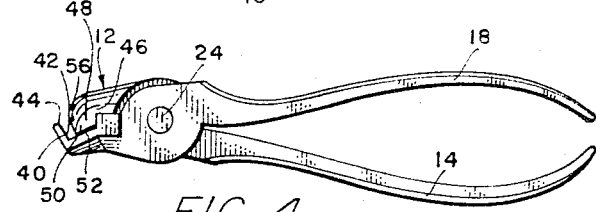
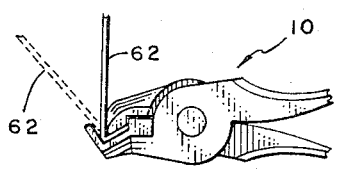
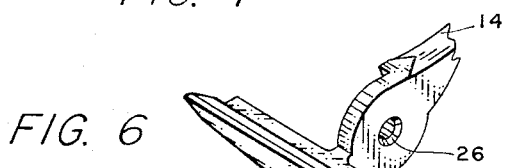
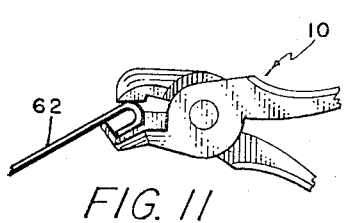
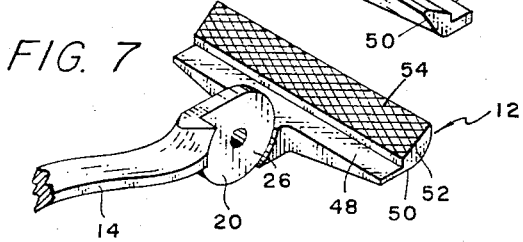
INVENTOR.
CHARLES C. SCHMIDT
BY Robert E. Breidenthal
ATTORNEY

United States Patent Office 3,364,724
Patented Jan. 23, 1968

3,364,724
DRIVE EDGE BENDING TOOL
Charles C. Schmidt, 3126 Arnold,
Topeka, Kans. 66614
Filed Mar. 2, 1965, Ser. No. 436,447
8 Claims. (Cl. 72—409)

ABSTRACT OF THE DISCLOSURE

A pliers type hand tool for enabling sheet metal workers to form a drive edge such as used in duct work. The tool has pivoted male and female jaws elongated in parallelism to the pivotal axis. The female jaw has a U-shaped transverse profile facing toward the male jaw, and the male jaw has a foot portion protruding toward and receivable in the female jaw, the extremity of the foot remote from the pivotal axis constituting an edge portion of sheet metal can be bent, initial bending being effected by application of the foot to press an edge portion of the sheet metal into the female jaw. The sheet metal marginal portion can then be inverted in the jaws and finally bent for a total of about 180° into spaced parallelism with the main sheet, with the outer end of the female jaw substantially preventing excessive bending.

---

The present invention relates to new and useful improvements in sheet metal working tools, and more particularly relates to a tool for use in bending or turning drive edges along straight end margins of a conduit or section of duct work whereby such duct work can be connected to an abutting conduit or section of duct work by a drive cleat. A closely related use of the tool resides in forming drive cleats.

The primary object of this invention is to provide a tool by means of which a drive edge may be conveniently and accurately turned or bent both with respect to the spacing of the bend from the edge and with respect to the degree of bending.

Yet another important object of this invenion is to provide a cool of the character specified in the preceding paragraph whereby an initial degree of bending is accomplished by simply gripping the sheet metal by the tool, and whereby a further degree of bending is accomplished by turning the tool with respect to the main body of the sheet metal while the marginal portion is still gripped by the tool; the total angle of bend accomplished by such initial and further bending being through an angle in excess of 90°.

Still another important object of the invention is to provide a tool of the character specified in the preceding paragraphs which will upon being inverted with respect to the sheet metal enable the user thereof by applying a gripping pressure to the turned or bent edge of the sheet metal to make a final bend that completes the forming of a drive edge ready for use in conjunction with a drive cleat in the conventional manner.

Yet another important object of the invention is to provide a sheet metal tool of the character defined in the preceding paragraphs such that the bending of the drive edge does not or with a short period of experience on the part of the user does not result in the drive edge being bent either too sharply at the apex or bight of the bend or in the free edge of the drive edge being turned back against or into close proximity to the main body of the sheet metal.

A broad aspect of the invention involves a sheet metal working tool for bending drive edges comprising male and female jaws, means operatively connecting said jaws for swinging movement about an axis between opened and closed positions, said jaws being elongated in parallelism with the axis, said male jaw having a foot portion protruding toward the female jaw that terminates in a substantially flat extremity approximately coplanar with and laterally spaced from the axis, said protrusion having opposite first and second sides that are relatively remote from and near to the axis, respectively, said female jaw receiving said protrusion when said jaws are in closed position, said female jaw including a generally flat face directly opposed to the flat extremity of the male jaw when the jaws are closed, said female jaw having a shoulder along one side of the flat face thereof that faces the latter and the second side of the protrusion when the jaws are closed, and said female jaw also being provided with an upstanding flange along the side of the flat face opposite the shoulder that is spaced from the second side of the protrusion when the jaws are closed.

Still another broad aspect of the invention involves a sheet metal working tool for bending drive edges comprising male and female jaws, means operatively connecting said jaws for swinging movement about an axis between opened and closed positions, said jaws being elongated in parallelism with the axis, said male jaw having a foot portion protruding toward the female jaw that terminates in a substantially flat extremity approximately coplanar with and laterally spaced from the axis, said protrusion having opposite first and second sides that are relatively remote from and near to the axis, respectively, said second side of the protrusion defining with the flat extremity thereof an included acute dihedral angle, said female jaw receiving said protrusion when said jaws are in closed position, said female jaw including a generally flat face directly opposed to the flat extremity of the male jaw when the jaws are closed, said female jaw having a shoulder along one side of the flat face thereof that faces the latter and the second side of the protrusion when the jaws are closed, and said female jaw also being provided with an upstanding flange along the side of the flat face opposite the shoulder that is spaced from the second side of the protrusion when the jaws are closed.

Yet another aspect of the invention involves a sheet metal working tool for use in bending drive edges comprising first and second jaws, means operatively connecting said jaws for relative swinging movement towards and away from each other about an axis, means for actuating swinging movement of the jaws toward each other, said jaws having cooperating adjacent faces that are elongated in parallelism to said axis, with the face of the first jaw having a profile in a plane normal to the axis that extends substantially straight from a first to a second position in a direction away from the second jaw to define a shoulder, thence substantially straight at about right angles in a direction away from the axis to a third position to define a substantially planar area, and thence at about right angles generally towards the second jaw to an edge position to define a side of a flange, said face of the second jaw having a profile in said plane such that when the jaws are in closed position extends substantially straight from a fourth position adjacent said first position to a third position adjacent the second position, thence extending substantially straight at about right angles to a fifth position closely adjacent the planar surface of the first jaw and spaced from the third position, and finally extending from said fifth position in a direction inclined at an acute angle to the planar surface end away from the third position to define a bending surface, whereby a marginal edge portion of a piece of sheet metal can be inserted between the jaws and against the shoulder, the jaws then forced towards closed position to grip the sheet metal forcibly therebetween and thereby partially bend the sheet metal along a line at the fifth position and while so gripped, the sheet metal can be further bent along such line by forcing the sheet metal onto the bending surface.

An important feature of the invention comprises the female jaw being provided with a shoulder constituting a limit or stop against which an edge of the sheet metal is seated, whereby the position of the end or bight is accurately spaced from such edge on gripping the sheet metal by the tool.

Still another important feature of the invention resides in the outer extremity of the male jaw constituting an acute dihedral angle over which the drive edge can be further bent after being initially gripped by the tool.

Yet another important feature of the invention resides in the female jaw having a transverse contour such that the drive edge can be received therein during the final gripping and bending operation.

Other objects, aspects and features of the invention will become appreciated in the light of the following description of a preferred embodiment of the invention taken in conjunction with the accompanying drawings illustrating the same, wherein:

FIGURE 1 is an isometric view of the tool;
FIGURE 2 is a top plan view of the tool;
FIGURE 3 is an end view of the tool taken from the jaw end thereof;
FIGURE 4 is a side elevation of the tool;
FIGURE 5 is an isometric view of the female jaw and a portion of the handle connected thereto;
FIGURE 6 is an isometric view of the male jaw and a portion of the handle connected thereto;
FIGURE 7 is another isometric view of the male jaw and a portion of the handle connected thereto, this view illustrating to better advantage the serrations formed at the outer flat extremity of the male protrusion; and,
FIGURES 8 through 11, inclusive, illustrate sequential steps in the use of the tool in bending a drive edge.

Referring now to the drawings wherein like numerals designate like parts throughout the various views, the reference numeral 10 designates generally the tool of this invention. The tool 10 comprises a male jaw designated generally at 12 provided with an integral actuating handle 14 and a female jaw designated generally at 16 that is provided with an integral actuating handle 18.

The handles 14 and 18 are provided adjacent their respective jaws 12 and 16 with recessed, generally flat circular bearing areas 20 and 22, respectively, that are seated in sliding engagement with each other for pivotal movement about a pivot pin 24 that extends through aligned openings 26 and 28 as shown in the drawings. Preferably, the openings 26 and 28 are countersunk and the pivot pin 24 secured in assembled position by having one end upset to be secured in the form of a rivet as clearly shown in dashed lines in FIGURE 2. While the described mode of pivotal connection of the jaws 12 and 16 and their associated handles is preferred for simplicity and economy in construction, it will be readily apparent to those skilled in the art as the following description proceeds that any conventional means can be employed for this purpose that is conventional in hand tools for causing manual actuation of jaws toward and away from each other about an axis.

As thus far described, swinging movement of the handles 14 and 18 towards each other about the axis of the pivot 24 is accompanied by swinging movement of the jaws 12 and 16 toward each other about the axis of the pivot 24, the arrangement being such that the handles 14 and 18 can be grasped in the user's hand and squeezed or gripped to urge the handles towards each other so as to urge with substantial mechanical advantage the jaws 12 and 16 toward each other.

As clearly shown in the drawings, each of the jaws 12 and 16 are greatly elongated in parallelism with the axis of the pivot pin 24, and the extent of such elongation is substantially greater than the greatest extent to which the jaws project radially from the axis of the pivot pin 24. It will also be seen on inspection of the drawings that the jaws 12 and 16 are of equal longitudinal extent and are centrally positioned with respect to their longitudinal extent in the plane of the bearing surfaces 20 and 22.

The female jaw 16 includes a raised portion 30 that extends toward the male jaw and which terminates in a substantially planar surface 32 that is approximately coplanar with the axis of the pivot pin 24. A shoulder 34 is defined at the side of the raised portion 30 that is remote from the pivot pin 24, such shoulder 34 being at approximately right angles to the surface 32 of the raised portion 30. The shoulder 34 is adjoined by a jaw portion 36 that extends from the pivot pin 24 and which has a substantially flat surface 38 facing toward the male jaw, the surface 38 and the shoulder 34 defining a dihedral angle of about 90° though preferably an obtuse angle such as that shown in the drawing. The outermost extent of the jaw portion 36 from the pivot pin 24 is provided with an upstanding flange or rib 40 having an inner, substantially flat surface 42 that defines in conjunction with the surface 38 and the shoulder 34 a substantially U-shaped configuration. The surface 42 and the surface 38 jointly define a dihedral angle of about 90° though preferably an obtuse angle as shown in the drawings is employed. For a reason subsequently to be explained, it is preferred that the outermost extremity of the flange or rib 40 be rounded, especially at the side of the surface 42 as indicated at 44.

The male jaw 12 is, as best shown in FIGURE 4, provided with a portion 46 having a surface 48 that preferably, though not necessarily, seats flush against the surface 32 of the female jaw 16. The outermost end portion 48 of the male jaw is provided with a protrusion 50 that extends toward the female jaw 16 between the shoulder 34 and the rib or flange 40, and such protrusion 50 terminates in a substantially flat surface 52 that is at least closely spaced in parallelism to the surface 38 of the female jaw 16 when the jaws 12 and 16 are closed and preferably such as to seat flush against the surface 38 when the jaws 12 and 16 are closed. For a reason subsequently to be explained the surface 52 of the male jaw 12 is preferably serrated as clearly shown in FIGURE 7 at 54. Also for a reason subsequently to be explained, the outermost extremity of the male jaw 12 is smoothly curved as indicated at 56 to define with the surface 52 an acute angle as clearly shown in the drawings.

As clearly apparent in the drawings, the outermost extremity of the male jaw 12 as defined by the surface 52 and the curved surface 56 is spaced from the rib or flange 40, such spacing being designated at 60 in FIGURE 2.

The use of the tool 10 will be readily understood upon inspection of FIGURES 8 through 11. In FIGURE 8, a piece of sheet metal 62 is shown having a marginal edge portion inserted between the opened jaws 12 and 16, and with the edge of the sheet metal being seated against the shoulder or stop 34. Such positioning of the sheet metal 62 with respect to the tool 10 causes the outermost extremity or bending edge 64 of the male jaw 12 to engage the sheet metal 62 upon a line parallel to and spaced a predetermined distance from the edge of the sheet metal. With the sheet metal 62 engaged by the tool 10 in the manner shown in FIGURE 8, gripping the handles 14 and 18 together forces the jaw towards closed position into the position shown in FIGURE 9 with the result that the sheet metal 62 is bent along a line 66 about the bending edge 64 of the male jaw 12. It will be noted that the previously described spacing 60 between the male jaw 12 and the rib or flange 40 serves to accommodate the thickness of the sheet metal 62 when the sheet metal 62 is bent into the configuration shown thereof in FIGURE 9 and the marginal portion 68 of the sheet metal gripped between the jaws 12 and 16.

With the sheet metal positioned and gripped by the tool 10 as shown in FIGURE 9, the sheet metal 62 can be bent about the turning or bending edge 64 of the male jaw 16 to change the amount of bend from an obtuse to an acute angle. This further bending will be readily understood upon inspection of FIGURE 10, wherein the position shown of the sheet metal in dotted outline indicates the amount of bend accomplished by gripping the handles 14 and 18, and the full line position of the sheet metal 62 shows the position thereof after the tool 10 has been turned to force the curved surface 56 against the sheet metal 62. It should be observed that it is preferred that the surface 56 be curved in the interest of strengthening the outer end portion of the male jaw and for the reason that the sheet metal 62 tends to be somewhat resilient, the curving of the surface 56 thereby allowing a sharper degree of bend at the edge 64 than might otherwise be obtained if the surface 56 were simply straight or planer.

It is pointed out that providing the surface 52 of the male jaw 12 with the serrations 54 tends to assure that the marginal portion 68 of the sheet metal 62 will not slip with respect to the male jaw 12 either during the initial gripping action that has been previously described in conjunction with FIGURES 8 and 9, and will not allow any slippage during the time that the sheet metal 62 is further bent as described in connection with FIGURE 10.

Inasmuch as the sheet metal 62 is drawn over the outermost edge 44 of the flange 40 during the gripping and bending operation described in conjunction with FIGURES 8 and 9, the rounding of the edge 44 serves to lessen resistance that would otherwise be occasioned by friction or gouging engagement of the tool by any sharp edge with the surface of the sheet metal 62. Thus, the rounding of the edge 44 cooperates with the serrations 54 of the male jaw 12 in assuring the bend 66 being formed in the sheet metal 62 at the correct spacing from the edge of the sheet metal 62.

After the sheet metal 62 has been bent to the configuration shown thereof in full lines in FIGURE 10, the sheet metal 62 is released from the tool 10, and reinserted in an inverted position relative to the tool 10, whereupon the handles 14 and 18 can be gripped to further bend the marginal portion 68 with respect to the rest of the sheet metal 62. The final bending operation just described is shown as such final bending operation is nearing completion, it being noted that to a very substantial extent the rib or flange 40 limits the extent to which the marginal portion 68 of the sheet metal 62 is bent, it being deemed evident tha texcessive flattening may seriously impair the ease with which the drive edge may be employed in conjunction with a drive cleat. It will also be noted upon inspection of FIGURE 11 that the shoulder or stop 34 and the surface 42 of the flange 40 cooperate in maintaining such a relationship between the workpiece and the tool that a tinsmith or workman employing the tool 10 can readily through experience become accustomed to the amount of gripping force necessary to accomplish the final bend in forming the drive edge.

When the length of a drive edge to be formed exceeds the longitudinal extent of the jaws (which can conveniently be from about 2½ to 5½ inches, though greater or lesser lengths can be employed; 3½ inches having been found in an actual working model to give excellent results), it has been found most convenient to successively apply the tool along the length of the sheet metal edge (little, if any, overlap in successive positioning of the tool being required), first, to accomplish only the initial bending; second, to accomplish the further bending; and, third, the final bending.

Not only can the tool be used to bend drive edges on duct work, but the tool can be employed to make drive cleats by bending opposing drive edges along the opposite edges of a rectangular piece of sheet metal. This is a great convenience when the supply of drive cleat available on the job is exhausted as craftsmen in this field will readily appreciate.

From the foregoing, it is believed that the principles of operation of the tool and the very substantial advantages to be derived from the use thereof will be readily comprehended by those familiar with the art. It will be understood that the tool 10 can be made of steel such as commonly employed in various hand tools such as pliers and the like, and that the simplicity of the tool 10 readily lends itself to economical fabrication techniques.

While the jaws 12 and 16 have been illustrated as associated with a simple pivot and handle arrangement common in the use of hand tools such as pliers and the like, it will be plain to those familiar with conventional hand tool constructions wherein jaws are actuated by handles to cause relative swinging and closing movements of the jaws that other and more sophisticated structures can be employed in lieu of the simple pivot and handle form of the invention as shown. Accordingly, other forms of manual jaw actuating structures of conventional character in pliers and gripping devices such as those well known in the art employing toggle links, cams, locking devices, etc., are deemed to lie within the purview of this invention.

The illustrated preferred embodiment of the invention is susceptible to numerous other variations, changes and modifications without departing from the spirit of the invention, and therefore attention is directed to the appended claims in order to ascertain the actual scope of the invention.

I claim:

1. A sheet metal working tool for bending drive edges comprising male and female jaws, means operatively connecting said jaws for swinging movement about an axis between opened and closed positions, said jaws being elongated and having their major dimensions in parallelism with the axis, said male jaw having a foot portion protruding toward the female jaw that terminates in a substantially flat extremity approximately coplanar with and laterally spaced from the axis, said foot portion being at the outermost extremity of the male jaw, said protrusion having opposite first and second sides that are relatively remote from and near to the axis, respectively, said female jaw receiving said protrusion when said jaws are in closed position, said female jaw including a generally flat face directly opposed to the flat extremity of the male jaw when the jaws are closed, said female jaw having a shoulder along one side of the flat face thereof that faces the second side of the protrusion when the jaws are closed, said shoulder being uninterrupted along said major dimensions, and said female jaw also being provided with an upstanding flange along the side of the flat face opposite the shoulder that is spaced from the second side of the protrusion when the jaws are closed.

2. A sheet metal working tool for bending drive edges comprising male and female jaws, means operatively connecting said jaws for swinging movement about an axis between opened and closed positions, said jaws being elongated and having their major dimensions in parallelism with the axis, said male jaw having a foot portion protruding toward the female jaw that terminates in a substantially flat extremity approximately coplanar with and laterally spaced from the axis, said protrusion having opposite first and second sides that are relatively remote from and near to the axis, said foot portion being at the outermost extremity of the male jaw, respectively, said female jaw receiving said protrusion when said jaws are in closed position, said female jaw including a generally flat face directly opposed to the flat extremity of the male jaw when the jaws are closed, said female jaw having a shoulder along one side of the flat face thereof that faces the second side of the protrusion when the jaws are closed, said shoulder being uninterrupted along said major dimensions, and said female jaw also being provided with an upstanding flange along the side of the flat face opposite the shoulder that is spaced from the second side of the protrusion when the jaws are closed, said flange being smoothly rounded at its upper edge adjacent the shoulder.

3. A sheet metal working tool for bending drive edges comprising male and female jaws, means operatively connecting said jaws for swinging movement about an axis between opened and closed positions, said jaws being elongated and having their major dimensions in parallelism with the axis, said male jaw having a foot portion protruding toward the female jaw that terminates in a substantially flat extremity approximately coplanar with and laterally spaced from the axis, said foot portion being at the outermost extremity of the male jaw, said protrusion having opposite first and second sides that are relatively remote from and near to the axis, respectively, said second side of the protrusion defining with the flat extremity thereof an included acute dihedral angle, said female jaw receiving said protrusion when said jaws are in closed position, said female jaw including a generally flat face directly opposed to the flat extremity of the male jaw when the jaws are closed, said female jaw having a shoulder along one side of the flat face thereof that faces the second side of the protrusion when the jaws are closed, said shoulder being uninterrupted along said major dimensions, and said female jaw also being provided with an upstanding flange along the side of the flat face opposite the shoulder that is spaced from the second side of the protrusion when the jaws are closed.

4. The combination of claim 3, wherein said second side of the protrusion has a convex surface.

5. The combination of claim 3, wherein said second side of the protrusion has a convex surface, said flange being smoothly rounded at its upper edge adjacent the shoulder.

6. A sheet metal working tool for use in bending drive edges comprising first and second jaws, means operatively connecting said jaws for relative swinging movement towards and away from each other about an axis, means for actuating swinging movement of the jaws toward each other, said jaws having cooperating adjacent faces that are elongated and having their major dimensions in parallelism to said axis, with the face of the first jaw having a profile in a plane normal to the axis that extends substantially straight from a first to a second position in a direction away from the second jaw to define a shoulder, said shoulder being uninterrupted along said major dimensions, thence substantially straight at about right angles in a direction away from the axis to a third position to define a substantially planar area, and thence at about right angles generally towards the second jaw to an edge position to define a side of a flange, said face of the second jaw having a profile in said plane such that when the jaws are in closed position extends substantially stright from fourth position adjacent said first position to fifth position adjacent the second position, thence extending substantially straight at about right angles to a sixth position closely adjacent the planar surface of the first jaw and spaced from the third position, and finally extending from said sixth position in a direction inclined at an acute angle to the planar surface and away from the third position to define a bending surface, whereby a marginal edge portion of a piece of sheet metal can be inserted between the jaws and against the shoulder, the jaws then forced towards closed position to grip the sheet metal forcibly therebetween and thereby partially bend the sheet metal along a line at the sixth position and while so gripped, the sheet metal can be further bent along such line by forcing the sheet metal onto the bending surface.

7. A sheet metal working tool for use in bending drive edges comprising male and female jaws, means for manually actuating said jaws for relative swinging movement toward each other about an axis, each of said jaws being elongated and having their major dimensions in the direction of the axis, said female jaw having a side thereof adjacent the male jaw that is generally U-shaped in transverse configuration that opens toward the male jaw, and said male jaw having a side thereof that is generally L-shaped in transverse configuration, said U-shaped configuration of the female jaw being defined in part by a substantially flat bight portion that is approximately coplanar with the axis, said L-shaped configuration of the male jaw being defined in part by a bending foot that extends toward the female jaw, said bending foot being received in the female jaw when the jaws are closed and such foot having a generally flat extremity that is adjacent and substantially coplanar with the bight portion when the jaws are closed, said male jaw being of lesser overall radial extent from the axis than the female jaw to space the radially outermost edge of the flange from the radially outermost edge of the bight portion of the female jaw.

8. The combination of claim 7, wherein said foot defines an acute dihedral angle along the radially outermost edge thereof, whereby a marginal portion of sheet metal gripped flatly between the bight portion of the female jaw and the flat extremity of the bending foot can be bent about such edge to an acute angle with the rest of the sheet metal.

References Cited

UNITED STATES PATENTS

| | | | |
|---|---|---|---|
| 2,625,067 | 1/1953 | Stone et al. | 72—412 X |
| 2,653,332 | 9/1953 | Precious | 72—409 X |
| 2,811,065 | 11/1957 | Johnson | 72—409 |

CHARLES W. LANHAM, *Primary Examiner.*

E. SUTTON, *Assistant Examiner.*